United States Patent
Hung et al.

(10) Patent No.: US 9,658,724 B2
(45) Date of Patent: May 23, 2017

(54) TOUCH SENSING CIRCUIT AND METHOD THEREOF

(71) Applicant: MStar Semiconductor, Inc., Hsinchu Hsien (TW)

(72) Inventors: Guo-Kiang Hung, Zhuebei (TW); Chih-Ying Chen, Zhuebei (TW); Hsuan-I Pan, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 63 days.

(21) Appl. No.: 14/640,266

(22) Filed: Mar. 6, 2015

(65) Prior Publication Data
US 2015/0261351 A1 Sep. 17, 2015

(30) Foreign Application Priority Data
Mar. 14, 2014 (TW) .............................. 103109345 A (51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC .... G06F 3/044; G06F 3/0418; G06F 3/03547; G06F 3/041; G06F 3/0412; G06F 3/0414; G06F 3/046; G06F 3/047; G06F 2203/041; G06F 3/045; G06F 2203/04107; G06F 2203/04111; G06F 2203/04112; G06F 2203/04113
See application file for complete search history.

(56) References Cited

U.S. PATENT DOCUMENTS

2014/0049507 A1* 2/2014 Shepelev .............. G06F 3/0412
345/174
2014/0062937 A1* 3/2014 Schwartz .............. G06F 3/0418
345/174

FOREIGN PATENT DOCUMENTS

TW 201144823 A 12/2011
TW 201250548 A 12/2012

OTHER PUBLICATIONS

Taiwan Office Action, Oct. 6, 2015, 11 pages.

* cited by examiner

*Primary Examiner* — Lun-Yi Lao
*Assistant Examiner* — Jarurat Suteerawongsa
(74) *Attorney, Agent, or Firm* — Edell, Shapiro & Finnan, LLC (57) ABSTRACT

A touch sensing circuit is applied to a touch panel to generate a sensing signal. The touch panel includes a sensing device. The touch sensing circuit includes: an interference signal detecting circuit, configured to detect an interference signal of the touch panel to generate an interference signal detection result; a control signal generating unit, configured to generate a control signal according to the interference signal detection result; and a sensed value analyzing circuit, configured to charge the sensing device in a first time interval and to discharge the sensing device in a second time interval, and to generate the sensing signal according to a sensed value of the sensing device. A length of one of the first time interval and the second time interval changes according to a control signal.

15 Claims, 12 Drawing Sheets

TOUCH SENSING CIRCUIT AND METHOD THEREOF

This application claims the benefit of Taiwan application Serial No. 103109345, filed Mar. 14, 2014, the subject matter of which is incorporated herein by reference.

BACKGROUND OF THE INVENTION

Field of the Invention

The invention relates in general to a touch sensing circuit, and more particularly to a touch sensing circuit and method capable of detecting an interference signal and adjusting charging and detection periods of the sensing circuit according to a detection result to enhance the sensing accuracy.

Description of the Related Art

Figure 1:
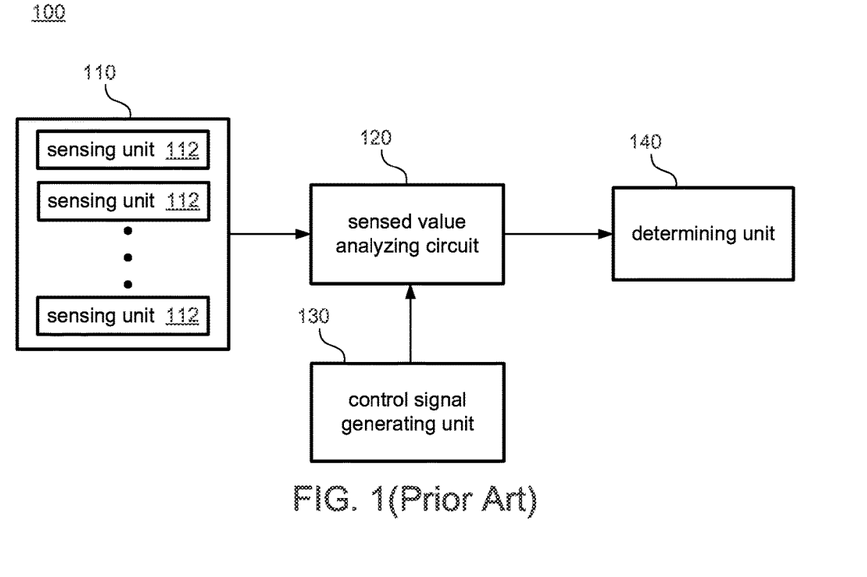
FIG. 1 is a function block diagram of a conventional touch sensing circuit.

FIG. 1 shows a function block of a conventional touch sensing circuit 100. The touch sensing circuit 100 includes a sensing device, a sensed value analyzing circuit 120, a control signal generating circuit 130 and a determining unit 140. For a capacitive touch panel, many transparent electrodes are disposed below a surface glass cover layer, and capacitance devices are equivalently formed between the transparent electrodes and a substrate of the touch panel. In FIG. 1, a plurality of sensing units 112 included in the sensing device 110 correspond to these capacitance devices. When a touch event occurs above the glass cover layer, equivalent capacitance between the transparent electrodes and the human body causes changes in capacitance values of the sensing units 112. That is, a sensed value generated by the sensing device 110 is changed due to the touch event. The sensed value analyzing circuit 120 analyzes the sensed value according to a control signal generated by the control signal generating circuit 130 and generates a sensing signal. According to the sensing signal, the determining unit 140 then determines information such as a position, the number of times and the duration of a touch position.

Figure 2:
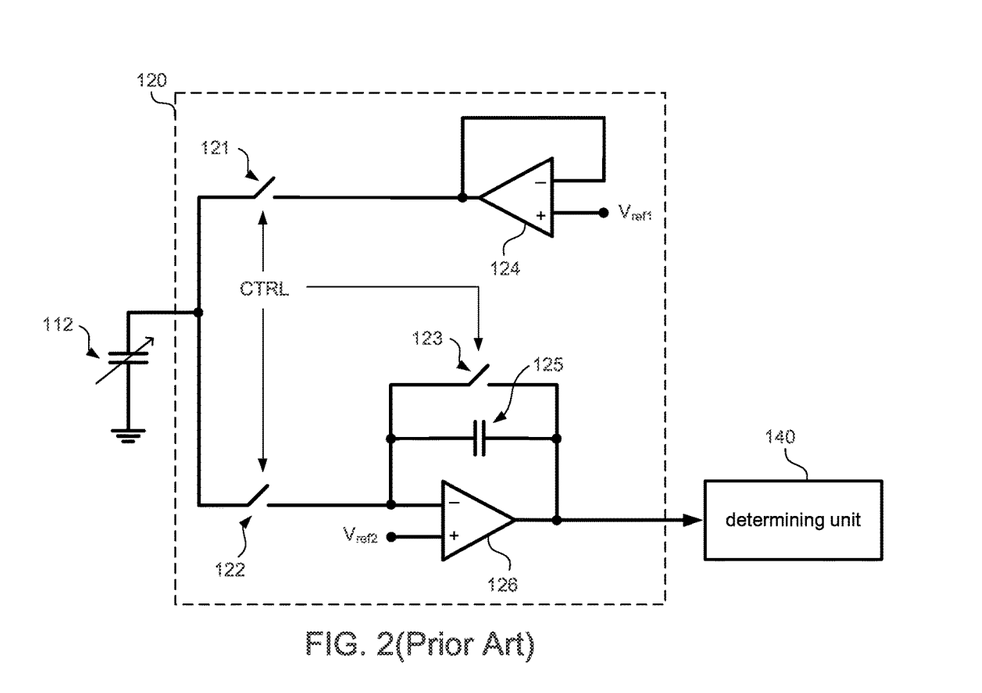
FIG. 2 is a detailed circuit diagram of a conventional sensed value analyzing circuit.

FIG. 2 shows a detailed circuit diagram of a conventional sensed value analyzing circuit 120. The sensed value analyzing circuit 120 includes switches 121, 122 and 123, operational amplifiers 124 and 126, and a capacitor 125. The switches 121, 122 and 123 are controlled by a control signal CTRL of the control signal generating unit 130 to be periodically turned on and turned off. The sensed value analyzing circuit 120 charges and detects (or samples) the sensing unit 112 according to different conduction paths. In a charging phase, the control signal CTRL turns on the switches 121 and 123 and turns off the switch 122, and an output end of the operational amplifier 124 charges the sensing unit 112 by a voltage $V_{ref1}$, while the capacitor 125 performs a discharging process. At the end of the charging phase, the end voltage of the sensing unit 112 is charged to $V_{ref1}$ and charges in the capacitor 125 are fully discharged. In a subsequent detection phase, the control signal CTRL turns off the switches 121 and 123 and turns on the switch 122. At this point, the charges on the sensing unit 112 are redistributed to the sensing unit 112 and the capacitor 125. As the capacitance value of the capacitor 125 and voltages $V_{ref1}$ and $V_{ref2}$ are set in advance, the determining unit 140 can obtain touch control information through detecting the voltage change of the output end of the operational amplifier 126 and accordingly determine the capacitance value (i.e., the sensed value) of the sensing unit 112.

Figure 3:
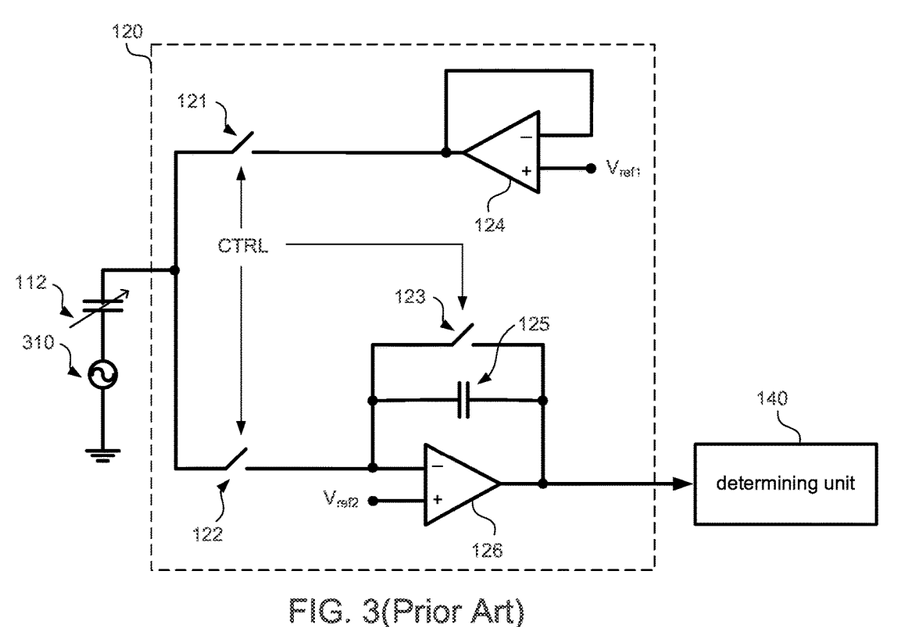
FIG. 3 is a circuit diagram of a conventional touch sensing circuit accompanied with a noise source.
Figure 4:
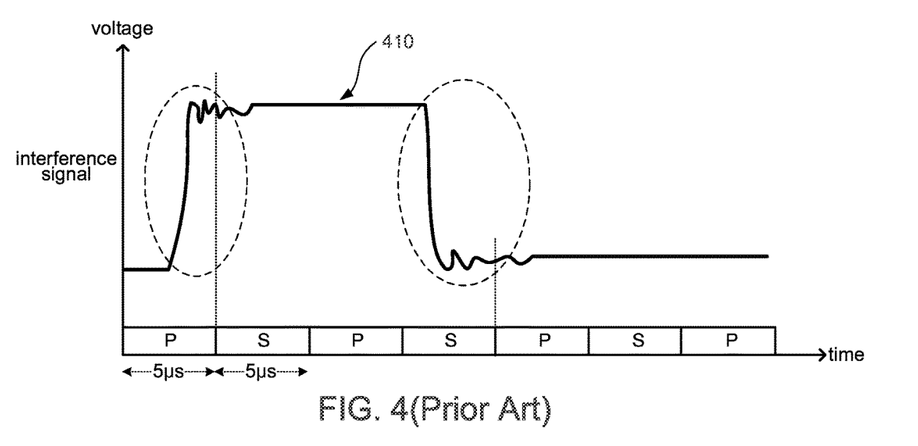
FIG. 4 is a relationship diagram of a charging phase and a detection phase of a conventional sensed value analyzing circuit corresponding to an interference signal.

In practice, a detection result of a touch panel may be incorrect due to the interference of external signals. For example, a charger with poor quality may couple noises to a touch panel, whose reference level may then fluctuate according to the noises. For the touch panel, the noises are equivalently coupled to the sensing nit 112 through the human body. FIG. 3 shows a circuit diagram of a conventional touch sensing circuit accompanied with a noise source. A noise source 310 is coupled to the touch panel via a contact node between the sensing unit 112 and the ground, and affects the charging and detection processes that the sensed value analyzing circuit 120 performs on the sensing unit 112. FIG. 4 shows a relationship diagram of the charging phase and the detection phase of the conventional sensed value analyzing circuit 120 corresponding to an interference signal. According to the control signal CTRL of the control signal generating unit 130, the sensed value analyzing circuit 120 performs a charging process on the sensing unit 112 in a charging phase P and performs a detection process on the sensing unit 112 in a detection phase S. The charging phase P and the detection phase S occur alternately, and have the same time period (5 µs in this example). A curve 410 is an interference signal of the noise source 310, and contains drastic changes in a range selected by the dotted frame. When the interference signal changes drastically at the instant when the charging phase or the detection phase S ends, the sensing unit 112 cannot be charged to the predetermined voltage $V_{ref1}$, and a final detection result is affected by the distribution of charges on the sensing unit 112 and the capacitor 125 in the detection phase S.

SUMMARY OF THE INVENTION

The invention is directed to a touch sensing circuit and a touch sensing method for mitigating effects that an interference signal has on the touch control sensitivity.

The present invention discloses a touch sensing circuit applied to a touch panel to generate a touch sensing result. The touch panel includes a plurality of capacitors. The touch sensing circuit includes: a sensed value analyzing circuit, configured to charge the capacitors in a first time interval and to discharge the capacitors in a second time interval, and to generate a sensing signal according to capacitance information of the capacitors; and a determining unit, configured to generate the touch sensing result according to the sensing signal. A length of one of the first time interval and the second time interval changes according to a control signal.

The present invention further discloses a touch sensing method applied to a touch panel to generate a touch sensing result. The touch panel includes a plurality of capacitors. The touch sensing method includes: charging the capacitors according to a control signal in a first time interval; discharging the capacitors according to the control signal in a second time interval; generating a sensing signal according to a capacitance value of the capacitors; and generating the touch sensing result according to the sensing signal. A length of one of the first time interval and the second time interval changes according to the control signal.

The present invention further discloses a touch sensing circuit applied to a touch panel to generate a sensing signal. The touch panel includes a sensing device. The touch sensing circuit includes: an interference signal detecting circuit, configured to detect an interference signal of the touch panel to generate an interference signal detection result; a control signal generating unit, configured to generate a control signal according to the interference signal detection result; and a sensed value analyzing circuit, configured to charge the sensing device in a first time interval and to discharge the sensing device in a second time interval, and to generate the sensing signal according to a sensed value of the sensing device. A length of one of the first time interval and the second time interval changes according to a control signal.

The touch sensing circuit and the touch sensing method of the present invention are capable of detecting changes in an interference signal, and adaptively adjusting periods of a charging phase and a detection phase of the touch sensing circuit when the interference signal gets too large, thereby mitigating the effect of the interference signal on the touch control sensitivity.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a touch sensing circuit and a touch sensing method capable of detecting an interference signal to mitigate an effect of the interference signal on the touch control sensitivity. The touch sensing circuit and the touch sensing method are applicable to capacitive touch panels. In possible implementation, one skilled person in the art may choose equivalent devices or steps to implement the disclosure based on the disclosure of the application. That is, the implementation of the disclosure is not limited in the embodiments disclosed in the disclosure. Further, a part of the elements included in the touch sensing circuit of the disclosure may be individually known. Without affecting the full disclosure and possible implementation of the device of the electrode design pattern, the known details are omitted. Further, the touch sensing method of the present invention may be implemented by the touch sensing circuit of the disclosure or an equivalent device. Without affecting full disclosure and possible implementation of the method, details of the method focus on steps instead of hardware.

Figure 5:
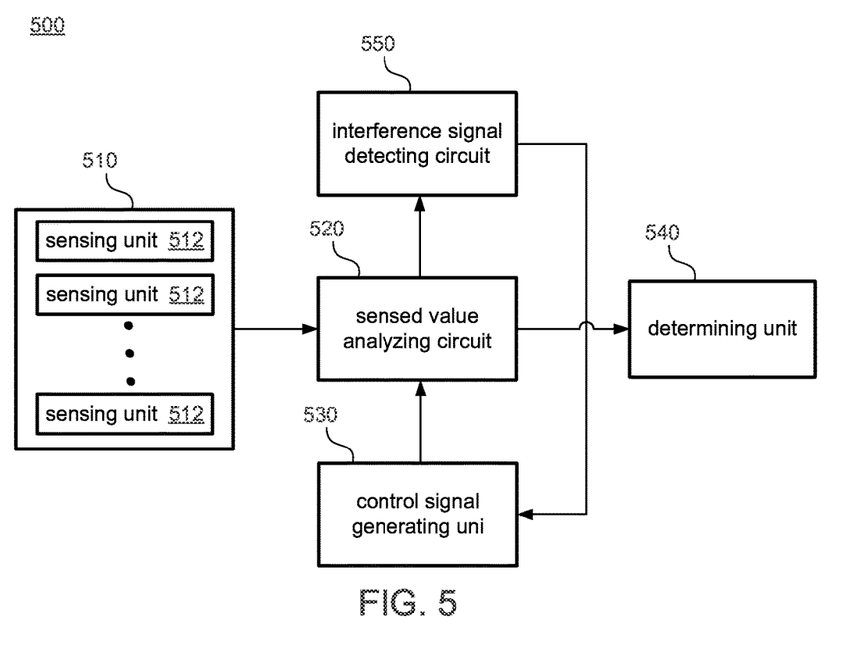
FIG. 5 is a function block diagram of a touch sensing circuit of the present invention.

FIG. 5 shows a function block diagram of a touch sensing circuit of the present invention. A touch sensing circuit 500 includes a sensing device 510, a sensed value analyzing circuit 520, a control signal generating unit 530, a determining unit 540 and an interference signal detecting circuit 550. The sensing device 510 includes a plurality of sensing units 512. Each of the sensing units 512 is coupled to the sensed value analyzing circuit 520, and may equivalently be a capacitance device whose capacitance value changes with a touch event on a touch panel. The sensed value analyzing circuit 520 analyzes a sensed value of the sensing device 510. More specifically, the sensed value analyzing circuit 520 analyzes the change in the capacitance value of each of the sensing units 512 to generate a sensing signal. The control signal generating unit 530 is coupled to the sensed value analyzing circuit 520, which determines an approach for analyzing the sensed value according to a control signal CTRL generated by the control signal generating unit 530. The interference signal detecting circuit 550, coupled to the sensed value analyzing circuit 520 and the control signal generating unit 530, determines whether the interference signal is too large according to a signal status of an operation of the sensed value analyzing circuit 520, and sends an interference signal detection result to the control signal generating unit 530. The control signal generating unit 530 adjusts the control signal CTRL according to the interference signal detection result, i.e., adjusting the operation approach that the sensed value analyzing circuit 520 analyzes the sensed value. By using a logic circuit, or through executing software by a processing unit with a computation capability, the control signal generating unit 530 generates the control signal CTRL according to the interference signal detection result. The determining unit 540, coupled to the sensed value analyzing circuit 520, first converts the sensing signal of the sensed value analyzing circuit 520 to a digital form by an analog-to-digital converter (ADC), and then determines touch information including a position, the number of times and the duration of a touch event by a predetermined algorithm. Detailed circuits and operation details of the sensed value analyzing circuit 520 and the interference signal generating circuit 550 are given below.

Figure 6:
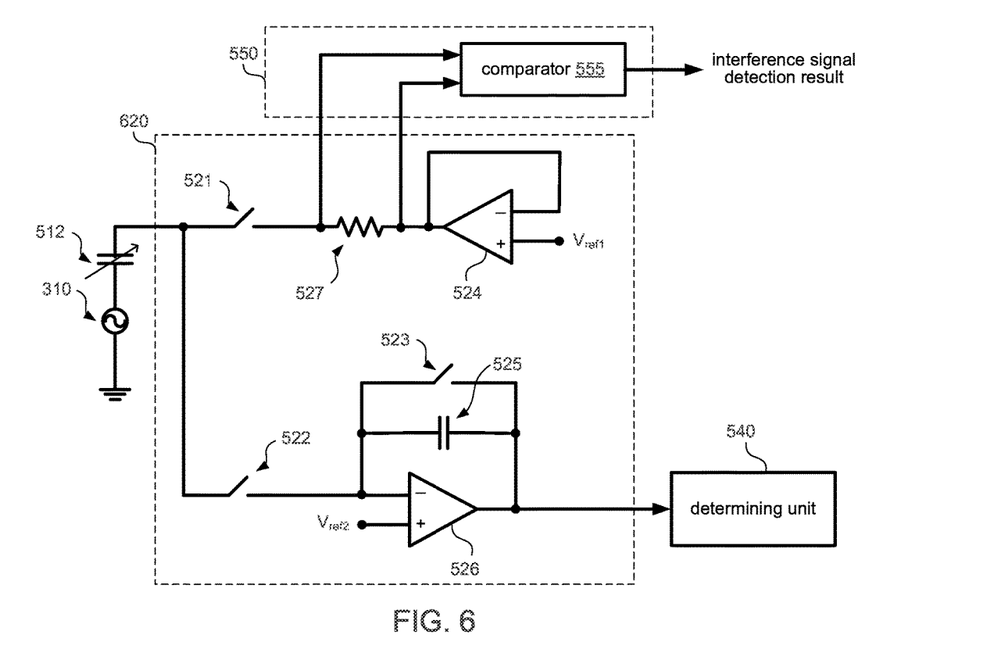
FIG. 6 is a detailed circuit diagram of a sensed value analyzing circuit and an interference signal detecting circuit of the present invention.

FIG. 6 shows a detailed circuit diagram of the sensed value analyzing circuit 520 and the interference signal detecting circuit 550 of the present invention. The sensed value analyzing circuit 520 in FIG. 5 may be implemented by a sensed value analyzing circuit 620. The sensed value analyzing circuit 620 includes switches 521, 522 and 523, operational amplifiers 524 and 526, a capacitor 525 and a resistor 527. The operational amplifier 524 serves as a voltage follower to provide an output end with a stable reference voltage $V_{ref1}$. In a charging phase, the switches 521 and 523 are turned on according to the control signal CTRL, and the switch 522 is turned off (open circuit)

according to the control signal CTRL. At this point, the reference voltage charges the sensing unit 512 via the resistor 527. On the other hand, the capacitor 525 is discharged. In the charging phase, the interference signal of the noise source 310 is coupled to the charging path via the sensing unit 512 to cause a change in a charging current on the charging path. The change in the charging current is reflected on a voltage difference between two ends of the resistor 527, and information of the voltage difference is processed by the interference signal detecting circuit 550 to generate an interference signal detection result. When the control signal CTRL changes, the switches 521 and 523 become turned off and the switch 522 becomes turned on, such that the sensed value analyzing circuit 520 exits the charging phase and enters a detection phase. At this point, the operational amplifier 526 keeps its inverted input end at a stable reference voltage $V_{ref2}$ to redistribute the charges on the sensing unit 512 to the sensing unit 512 and the capacitor 525. Thus, for the sensing unit 512, the capacitor 525 and the operational amplifier 526 are equivalently discharging units, and the sensing unit 512 discharges via the discharging path that connects the sensing unit 512 and the capacitor 525. As the charges are redistributed, the voltage (i.e., the sensing signal) at an output end of the operational amplifier 526 also changes. The determining unit 540 then learns the capacitance value (i.e., the sensed value) of the sensing unit 512 according to the voltage change.

Figure 7:
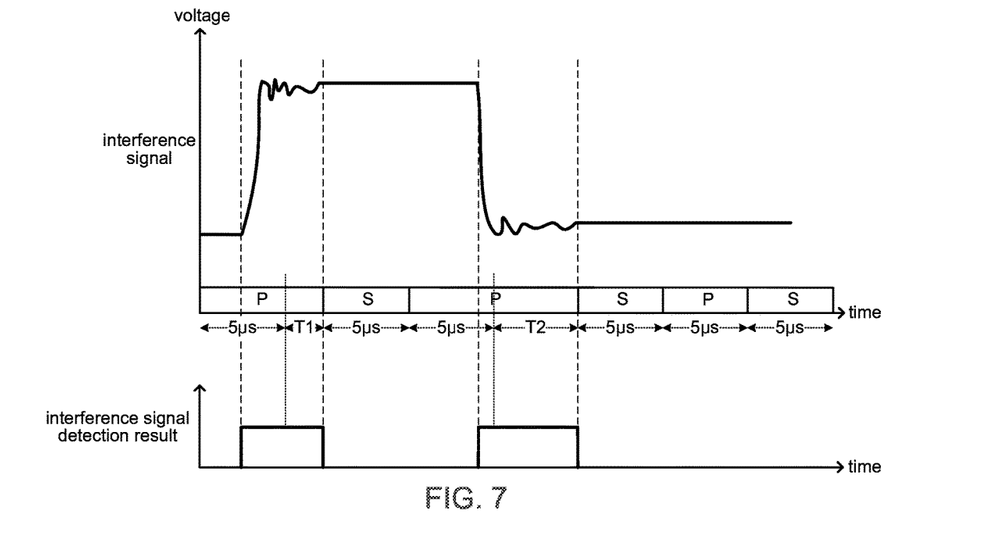
FIG. 7 is a relationship diagram of a charging phase and a detection phase of a sensed value analyzing circuit of the present invention corresponding to an interference signal and an interference signal detection result.

The interference signal detecting circuit 550 includes a comparator 555. The comparator 555 compares the voltage difference between two ends of the resistor 527 with a predetermined value, and generates the interference signal detecting result according to the comparison result. For example, a high-level signal represents that the value of the interference signal exceeds the predetermined value, and a low-level signal represents that the interference signal is within an acceptable range. The above predetermined value may be adjusted according to actual situations of the interference signal. FIG. 7 shows a relationship diagram of the charging phase and the detection phase of sensed value analyzing circuit 620 of the present invention corresponding to the interference signal and the interference signal detection result. When the interference signal changes drastically, in the embodiment, the interference signal detecting circuit 550 correspondingly outputs a high-level interference signal detection result, and the control signal generating unit 530 adjusts the control signal CTRL according to the interference signal detection result, such that the period of the charging phase of the sensed value analyzing circuit 520 is adjusted with the interference signal. For example, the first charging phase P in FIG. 7 is expectedly to end after reaching the predetermined 5 μs. However, as the interference signal detection result at this point indicates that there is a drastic change in the interference signal, the control signal generating unit 530 extends the turn-on period of the switches 521 and 523, and only changes the control signal CTRL to prompt the sensed value analyzing circuit 520 to enter the detection phase S from the charging phase P when the interference signal detection result indicates that the interference signal has become stable. As a result, the charging phase P is greater than the predetermined period by a period T1. Similarly, the second charging phase P is also extended by a period T2 due to the interference signal. The above operations ensure that the charging phase P ends in a period in which the interference signal is smaller, thereby reducing the effect of the interference signal on the touch panel.

The above extending mechanism sets a charging phase to be extended when the change in the interference signal exceeds the predetermined value, and ends the extension when the interference signal has become stable. To prevent an excessively extended period from delaying the response time of the touch panel, the control signal generating unit 530 may set a wait mechanism. When the extended period exceeds a predetermined waiting period, the control signal CTRL is forcibly changed even if the interference signal is large, so as to prompt the sensed value analyzing circuit 520 to exit the charging phase and to enter the detection phase. In another approach, when the control signal CTRL controls a charging phase to be extended, the control signal generating unit 530 checks the interference signal detection result at an interval, e.g., 1 μs, and changes the control signal CTRL when the interference signal detection result does not indicate a large interference signal, so as to prompt the sensed value analyzing circuit 520 to exit the charging phase and to enter the detection phase.

Figure 8:
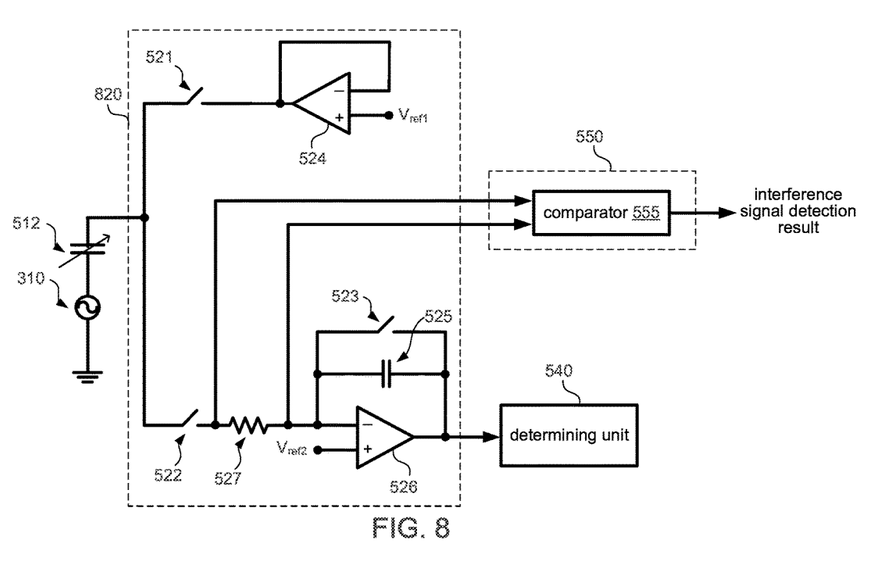
FIG. 8 is a detailed circuit diagram of a sensed value analyzing circuit and an interference signal detecting circuit according to another embodiment of the present invention.
Figure 9:
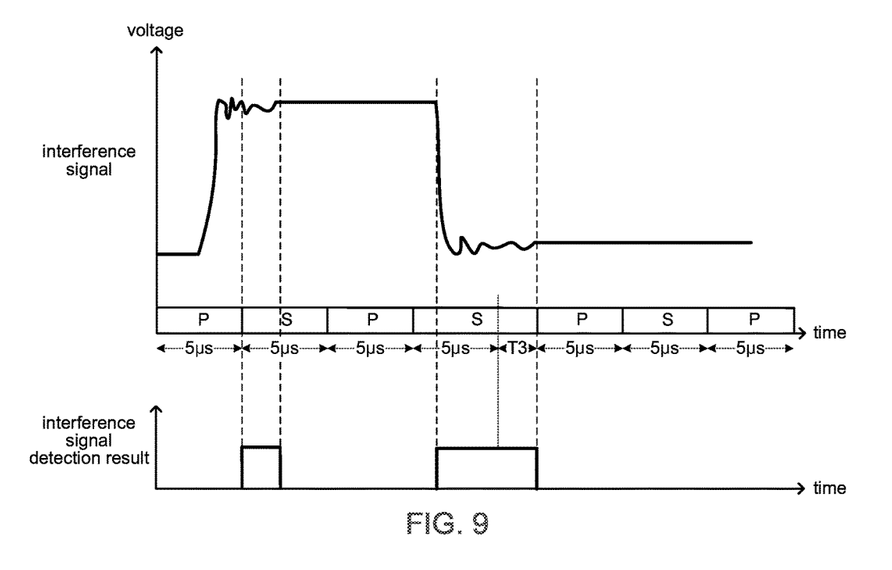
FIG. 9 is another relationship diagram of a charging phase and a detection phase of a sensed value analyzing circuit of the present invention corresponding to an interference signal and an interference signal detection result.

FIG. 8 shows a detailed circuit diagram of the sensed value analyzing circuit 520 and the interference signal detecting circuit 550 according to another embodiment of the present invention. The sensed value analyzing circuit 520 in FIG. 5 may be implemented by a sensed value analyzing circuit 820. In the embodiment, the resistor 527 is located on the discharging path of the sensed value analyzing circuit 820. Thus, in the detection phase, the interference signal detecting circuit 550 may monitor changes in the interference signal and generate the interference signal detection result. FIG. 9 shows a relationship of a charging phase and a detection phase of the sensed value analyzing circuit 820 of the present invention corresponding to an interference signal and an interference signal detection result. When the control signal CTRL turns on the switch 522, the sensed value analyzing circuit 820 enters the detection phase, meanwhile the interference signal detecting circuit 550 starts detecting the interference signal. In the embodiment, a high-level interference signal detection result is similarly used to indicate a large change in the interference signal. As seen from the diagram, since an ending time point of the first detection phase S does not fall in a period in which the interference signal detection result is at a high level for the first time, the predetermined period length is maintained. However, when the second detection phase S ends, the interference signal detection result is at a high level. Thus, the control signal CTRL extends the switching time point, and controls the second detection phase S to end only when the change in the interference signal becomes moderate after the period T3.

Figure 10:
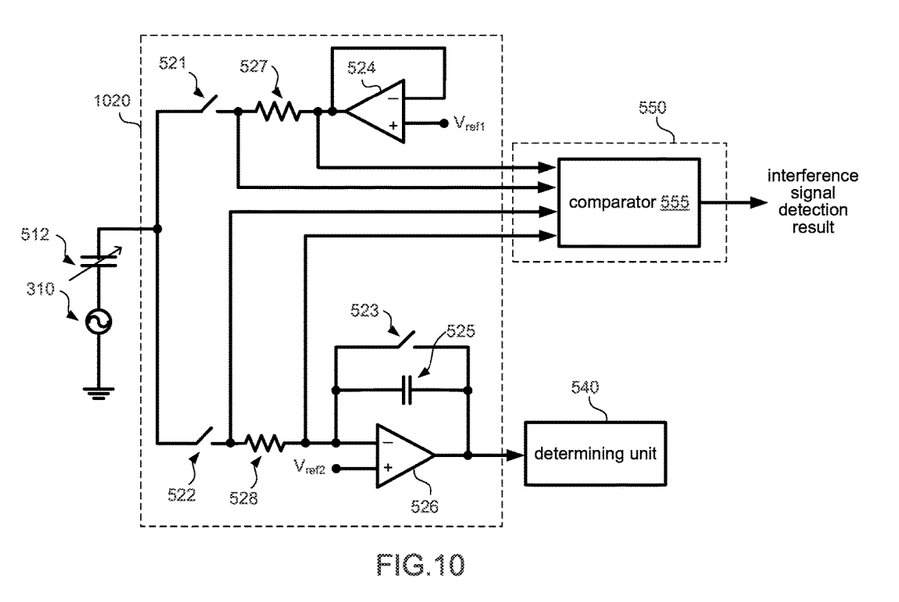
FIG. 10 is a detailed circuit diagram of a sensed value analyzing circuit and an interference signal detecting circuit according to another embodiment of the present invention.
Figure 11:
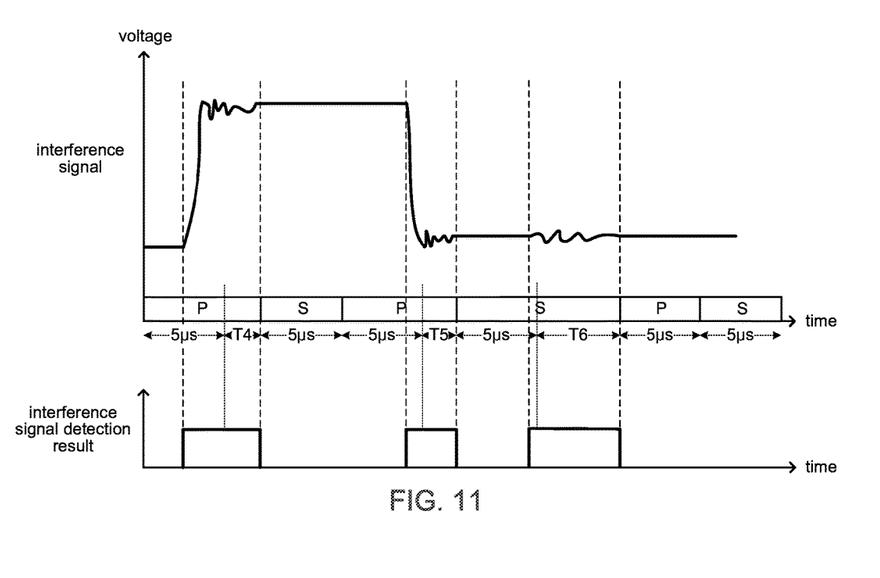
FIG. 11 is another relationship diagram of a charging phase and a detection phase of a sensed value analyzing circuit of the present invention corresponding to an interference signal and an interference signal detection result.

FIG. 10 shows a detailed circuit diagram of a sensed value analyzing circuit and an interference signal detecting circuit according to circuit 520 in FIG. 5 may be implemented by a sensed value analyzing circuit 1020. The charging and discharging paths of the sensed value analyzing circuit 1020 respectively include a resistor 527 and a resistor 528. The interference signal detecting circuit 550 compares respective cross-voltages of the resistor 527 and the resistor 528 with a predetermined value to obtain an interference signal detection result. More specifically, in the charging phase P, the comparator 555 compares the cross-voltage of the resistor 527 with the predetermined value; in the detection phase S, the comparator 555 compares the cross-voltage of the resistor 528 with the predetermined value. In the embodiment, a relationship of the charging phase P and the detection phase S corresponding to the interference signal and the interference signal detection result is shown in FIG. 11. One person skilled in the art should easily understand the variations and corresponding relationships of the signal based on the disclosed embodiments, and such details shall be omitted herein.

It should be noted that, in another preferred embodiment, in FIG. 6, the interference signal detecting circuit 550 includes the resistor 527, whereas the sensed value analyzing circuit 620 does not include the resistor 527. Similarly, in FIG. 8, the interference signal detecting circuit 550 includes the resistor 527, whereas the sensed value analyzing circuit 820 does not include the resistor 527; in FIG. 10, the interference signal detecting circuit 550 includes the resistors 527 and 528, whereas the sensed value analyzing circuit 1020 does not include the resistors 527 and 528.

Figure 12:
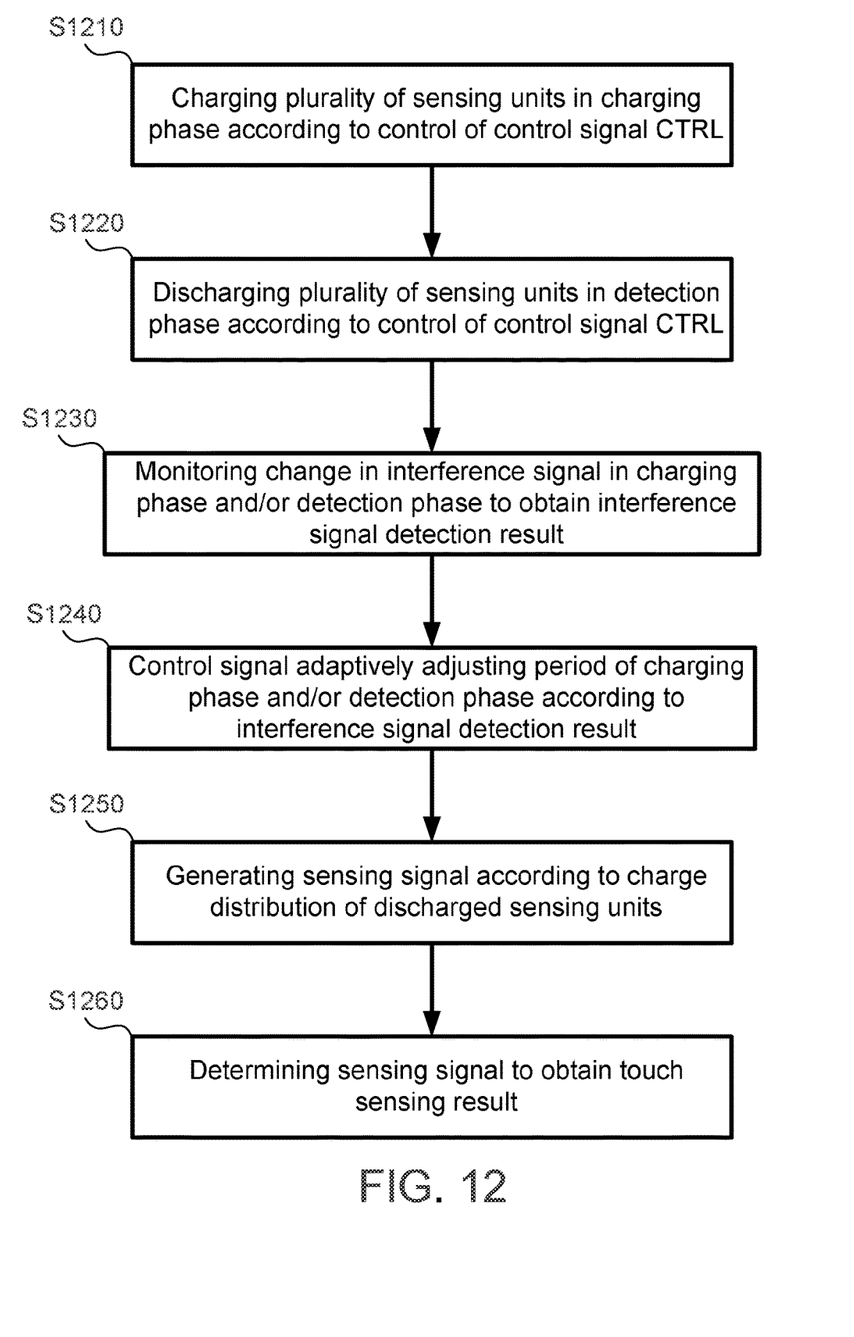
FIG. 12 is a flowchart of a touch sensing method according to an embodiment of the present invention.

FIG. 12 shows a process of a touch sensing method according to an embodiment of the present invention. In addition to the touch sensing circuit, the present invention correspondingly discloses a touch sensing method applied to capacitive touch panels to prevent noise interference. The touch sensing method may be performed by the foregoing touch sensing circuit 500 or an equivalent device. As shown in FIG. 12, the touch sensing method according to an embodiment includes following steps.

In step S1210, according to the control of a control signal CTRL, a plurality of sensing units are charged in a charging phase. For a capacitive touch panel, the sensing units are equivalently capacitor devices, whose capacitance values change in response to a touch event. To detect the changes in the capacitance values, in this step, the sensing units are charged by a charging path in a predetermined period to accumulate the charges on the sensing units.

In step S1220, according to the control of the control signal CTRL, the plurality of sensing units are discharged in a detection phase. When the charging phase ends, the control signal CTRL prompts the sensing method to enter the detection phase. In the detection phase of this step, the sensing units are discharged by a discharging path in a predetermined period to transfer a part of charges to another capacitor via the discharging path.

In step S1230, in the charging phase and/or the detection phase, a change in an interference signal is monitored to obtain an interference signal detection result. The interference signal detection result can reflect the value of the interference signal by a change in levels. For example, a high level represents that the change in the interference signal is greater than a tolerable range. To monitor the interference signal, a resistor may be disposed on the charging path S1210 and/or the discharging path in step S1220, and the interference signal may produce a voltage change on the resistor. By comparing the cross-voltage of the resistor with a predetermined value, it can be learned whether the interference signal is too large. The above resistor is disposed on one of the charging path and the discharging path, or disposed on both paths at the same time.

In step S1240, according to the interference signal detection result, the control signal CTRL adaptively adjusts the period of the charging phase and/or the detection phase. The control signal CTRL originally controls the charging phase and the detection phase to switch alternately by a predetermined period, and the touch sensing method switches from one phase to the other phase when the predetermined period is reached. However, if the change in the interference signal is too large at the instant of switching the periods, the touch sensing method is prone to suffer from the effect of the interference signal in a way that the touch sensing accuracy is lowered. Thus, the control signal CTRL of the present invention adjusts the period according to the interference signal detection result. When the interference signal detection result is at a high level, the control signal CTRL extends the period of the phase to reduce the effect of the interference signal. The changes and corresponding relationship of the signals may be referred from FIG. 7, FIG. 9 and FIG. 11. The extended period is not limited to ending only when the change of the interference signal is smaller than an acceptable range. Other details are disclosed in the description associated with the foregoing touch sensing circuit, and shall be omitted herein.

In step S1250, a sensing signal is generated according to the charge distribution of the discharged sensing units. As described in step S1220, the charges on the discharged sensing units are redistributed to the sensing units and another capacitor. The change in the end voltage of the capacitor represents the sensing value (i.e., the capacitance value) of the sensing units, i.e., the end voltage of the capacitor may serve as the sensing signal generated from analyzing the sensed values of the sensing units.

In step S1260, the sensing signal is determined to obtain a touch sensing result. The sensing result may be converted to a digital form by an analog-to-digital converter (ADC), and touch information including a position, the number of times and the duration of the touch event can be determined by a predetermined algorithm.

One person skilled in the art can understand implementation details and variations of the method in FIG. 12 from the disclosure of the circuit in FIG. 5 to FIG. 11. Without affecting full disclosure and implementation of the method of the present invention, such details are omitted herein. It should be noted that, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. The touch sensing circuit of the present invention is applicable to self-capacitive touch panels and mutual-capacitive touch panels.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch sensing circuit, applied to a touch panel to generate a touch sensing result, the touch panel comprising a plurality of capacitors, the touch sensing circuit comprising:
a sensed value analyzing circuit, configured to charge the capacitors in a first time interval and to discharge the capacitor in a second time interval, and to generate a sensing signal according to capacitance information of the capacitors; and
a determining unit, configured to generate the touch sensing result according to the sensing signal;
wherein, a length of one of the first time interval and the second time interval changes according to a control signal,
an interference signal detecting circuit, coupled to the sensed value analyzing circuit, configured to detect an interference signal of the touch panel to generate an interference signal detection result;

a control signal generating unit, configured to generate the control signal according to the interference signal detection result; and wherein the control signal generating unit determines the length of one of the first time interval and the second time interval according to a first predetermined period and the interference signal detection result: when the interference signal detection result after reaching the first predetermined period indicates a presence of interference, the control signal generating unit extends the length of the first time interval by a second predetermined period via the control signal, wherein a time point that the first predetermined period is reached is not later than an end of an unextended first time interval.

2. The touch sensing circuit according to claim 1, wherein the sensed value analyzing circuit comprises:
   a charging unit, configured to charge the capacitors via a charging path; and
   a resistor, located on the charging path; and
   the interference signal detecting circuit comprises:
   a comparison unit, coupled to the resistor, configured to compare a cross-voltage of the resistor with a predetermined value to generate the interference signal detection result.

3. The touch sensing circuit according to claim 1, wherein the sensed value analyzing circuit comprises:
   a discharging unit, configured to discharge the capacitors via a discharging path; and
   a resistor, located on the discharging path; and
   the interference signal detecting circuit comprises:
   a comparison unit, coupled to the resistor, configured to compare a cross-voltage of the resistor with a predetermined value to generate the interference signal detection result.

4. The touch sensing circuit according to claim 1, wherein the sensed value analyzing circuit comprises:
   a charging unit, configured to charge the capacitors via a charging path; and;
   a discharging unit, configured to discharge the capacitors via a discharging path;
   a first resistor, located on the charging path; and
   a second resistor, located on the discharging path; and
   the interference signal detecting circuit comprises:
   a comparison unit, coupled to the first resistor and the second resistor, configured to compare a cross-voltage of the first resistor with a first predetermined value and a second cross-voltage of the second resistor with a second predetermined value to generate the interference signal detection result.

5. The touch sensing circuit according to claim 1, wherein after reaching the second predetermined period, the control signal generating unit selectively extends the length of one of the first time interval and the second time interval by the second predetermined period via the control signal.

6. A touch sensing method, applied to a touch panel to generate a touch sensing result, the touch panel comprising a plurality of capacitors, the method comprising:
   charging the capacitors according to a control signal in a first time interval;
   discharging the capacitor according to the control signal in a second time interval;
   generating a sensing signal according to a capacitance value of the capacitors;
   and generating the touch sensing result according to the sensing signal;
   wherein, a length of the one of the first time interval and the second time interval changes according to the control signal,
   the method further comprising:
   detecting an interference signal of the touch panel to generate an interference signal detection result;
   generating the control signal according to the interference signal detection result, and
   when the interference signal indicates a presence of interference after reaching a first predetermined period, extending the length of the first time interval by a second predetermined period, wherein a time period that the first predetermined period is reached is not later than an end of an unextended first time interval.

7. The touch sensing method according to claim 6, wherein the step of charging the capacitors charges the capacitors via a charging path, the charging path comprises a resistor, and the step of detecting the interference signal of the touch panel to generate the interference signal detection result comprises:
   comparing a cross-voltage of the resistor with a predetermined value to generate the interference signal detection result.

8. The touch sensing method according to claim 6, wherein the step of discharging the capacitors discharges the capacitors via a discharging path, the discharging path comprises a resistor, and the step of detecting the interference signal of the touch panel to generate the interference signal detection result comprises:
   comparing a cross-voltage of the resistor with a predetermined value to generate the interference signal detection result.

9. The touch sensing method according to claim 6, wherein the step of charging the capacitors charges the capacitors via a charging path, the charging path comprises a first resistor, the step of discharging the capacitors discharges the capacitors via a discharging path, the discharging path comprises a second resistor, and the step of detecting the interference signal of the touch panel to generate the interference signal detection result comprises:
   comparing a cross-voltage of the first resistor with a first predetermined value and comparing a cross-voltage of the second resistor with a second predetermined value to generate the interference signal detection result.

10. The touch sensing method according to claim 6, further comprising:
    after reaching the second predetermined period, selectively extending the length of the one of the first time interval and the second time interval by the second predetermined period according to the interference signal detection result.

11. A touch sensing circuit, applied to a touch panel to generate a sensing signal, the touch panel comprising a sensing device, the touch sensing circuit comprising:
    an interference signal detecting circuit, configured to detect an interference signal of the touch panel to generate an interference signal detection result;
    a control signal generating unit, configured to generate a control signal according to the interference signal detection result; and
    a sensed value analyzing circuit, configured to charge the sensing device in a first time interval and to discharge the sensing device in a second time interval, and to generate the sensing signal according to a sensed value of the sensing device, wherein a length of one of the first time interval and the second time interval changes according to a control signal, wherein the control signal generating unit determines the length of one of the first time interval and the second time interval according to a first predetermined period and the interference signal detection result; when the interference signal detection result after reaching a predetermined period indicates a presence of interference, the control signal generating unit extends the length of the first time interval by a second predetermined period via the control signal, wherein a time point that the first predetermined period is reached is not later than an end of an unextended first time interval.

12. The touch sensing circuit according to claim 11, wherein the sensing device comprises a plurality of capacitors, the sensed value analyzing circuit comprises:

a charging unit, configured to charge the capacitors via a charging path according to the control signal; and a resistor, located on the charging path; and the interference signal detecting circuit comprises:

a comparison unit, coupled to the resistor, configured to compare a cross-voltage of the resistor with a predetermined value to generate the interference signal detection result.

13. The touch sensing circuit according to claim 11, wherein the sensing device comprises a plurality of capacitors, the sensed value analyzing circuit comprises:

a discharging unit, configured to discharge the capacitors via a discharging path according to the control signal; and a resistor, located on the discharging path; and the interference signal detecting circuit comprises:

a comparison unit, coupled to the resistor, configured to compare a cross-voltage of the resistor with a predetermined value to generate the interference signal detection result.

14. The touch sensing circuit according to claim 11, wherein the sensing device comprises a plurality of capacitors, the sensed value analyzing circuit comprises:

a charging unit, configured to charge the capacitors via a charging path according to the control signal;

a discharging unit, configured to discharge the capacitors via a discharging path according to the control signal;

a first resistor, located on the charging path; and a second resistor, located on the discharging path; and the interference signal detecting circuit comprises:

a comparison unit, coupled to the first resistor and the second resistor, configured to compare a cross-voltage of the first resistor with a first predetermined value and a second cross-voltage of the second resistor with a second predetermined value to generate the interference signal detection result.

15. The touch sensing circuit according to claim 11, wherein after reaching the second predetermined period, the control signal generating unit selectively extends the length of one of the first time interval and the second time interval by the second predetermined period via the control signal according to the interference signal detection result.

* * * * *